United States Patent
Tsunekawa

(10) Patent No.: US 8,847,792 B2
(45) Date of Patent: Sep. 30, 2014

(54) OBJECT DETECTION APPARATUS AND OBJECT DETECTION PROGRAM

(75) Inventor: Jun Tsunekawa, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/574,716

(22) PCT Filed: Sep. 24, 2010

(86) PCT No.: PCT/JP2010/005779
§ 371 (c)(1),
(2), (4) Date: Jul. 23, 2012

(87) PCT Pub. No.: WO2012/039012
PCT Pub. Date: Mar. 29, 2012

(65) Prior Publication Data
US 2013/0169449 A1 Jul. 4, 2013

(51) Int. Cl.
*G08G 1/01* (2006.01)
*G08G 1/16* (2006.01)
*G01S 13/72* (2006.01)
*G01S 13/93* (2006.01)

(52) U.S. Cl.
CPC ......... *G08G 1/166* (2013.01); *G01S 2013/9357* (2013.01); *G01S 13/72* (2013.01); *G01S 13/931* (2013.01)
USPC ........... 340/933; 340/903; 340/904; 340/943; 340/435; 340/436; 340/438; 342/70; 342/71

(58) Field of Classification Search
CPC .............................. B60R 21/0134; G08B 1/16
USPC ......... 340/933, 903, 904, 943, 435, 436, 438; 342/70, 71
See application file for complete search history.

(56) References Cited

U.S. PATENT DOCUMENTS 6,087,975 A * 7/2000 Sugimoto et al. ................ 342/70
7,876,203 B2 * 1/2011 Traylor et al. ................. 340/435
(Continued)

FOREIGN PATENT DOCUMENTS

DE      100 29 710 A1    1/2001
DE   10 2005 052 288 A1  6/2006
(Continued)

OTHER PUBLICATIONS

International Search Report Issued Nov. 30, 2010 in PCT/JP10/05779 Filed Sep. 24, 2010.

*Primary Examiner* — Tai T Nguyen
(74) *Attorney, Agent, or Firm* — Oblon, Spivak, McClelland, Maier & Neustadt, L.L.P.

(57) ABSTRACT

Provided is an object detection apparatus capable of accurately estimating the movement amount of the position, which moves within an oncoming vehicle, of a reflection point of an electromagnetic wave radiated from a radar apparatus, and using the movement amount for collision possibility determination. The object detection apparatus provided in a vehicle includes: a relative position detection section radiating the electromagnetic wave to an object in front of the vehicle, and receiving a reflection wave from the object, thereby detecting the relative position, to the vehicle, of an electromagnetic wave reflection point on the object reflecting the electromagnetic wave; and a movement amount estimation section capable of, based on the relative position to the vehicle of the electromagnetic wave reflection point, estimating, as continuous values, a movement amount of the electromagnetic wave reflection point on the object from a predetermined timing until the object approaches the vicinity of the vehicle.

8 Claims, 12 Drawing Sheets

(56) References Cited

U.S. PATENT DOCUMENTS

| | | | |
|---|---|---|---|
| 8,031,107 B2 * | 10/2011 | Sasabuchi et al. ............ 342/70 |
| 2010/0271256 A1 | 10/2010 | Tsunekawa | |
| 2011/0301845 A1 | 12/2011 | Harada | |

FOREIGN PATENT DOCUMENTS

| | | |
|---|---|---|
| DE | 11 2007 000 468 T5 | 1/2009 |
| DE | 10 2008 063 033 A1 | 9/2009 |
| JP | 7 14100 | 1/1995 |
| JP | 2007 223395 | 9/2007 |
| JP | 2007 279892 | 10/2007 |
| JP | 2008 84138 | 4/2008 |
| JP | 2008 298543 | 12/2008 |
| JP | 2008-298543 | 12/2008 |
| JP | 2010 44461 | 2/2010 |
| WO | 2010 064282 | 6/2010 |
| WO | 2010 086895 | 8/2010 |

* cited by examiner

F I G. 6
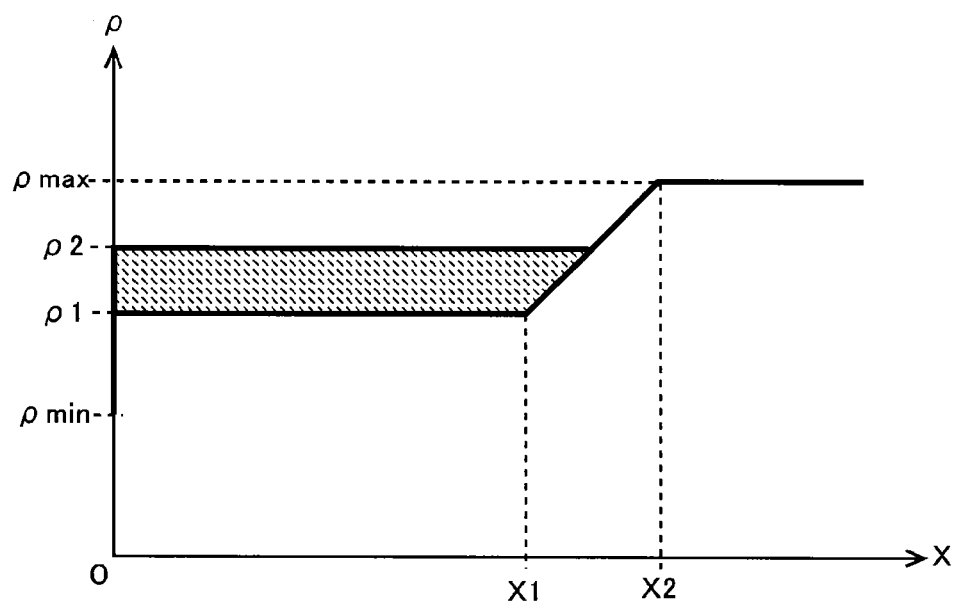

OBJECT DETECTION APPARATUS AND OBJECT DETECTION PROGRAM

TECHNICAL FIELD

The present invention relates to an object detection apparatus and an object detection program, and more particularly, to an object detection apparatus and an object detection program that allow a vehicle travelling on its travelling lane to detect an oncoming vehicle travelling on an oncoming lane, for example.

BACKGROUND ART

Conventionally, various apparatuses, methods, and the like have been proposed which estimate whether or not there is a possibility that a vehicle will collide with an oncoming vehicle travelling on an oncoming lane. For example, a vehicle collision preventing apparatus below is disclosed (see Patent Literature 1). That is, first, the position of the vehicle as it will be after a predetermined time is estimated, and the veering-off amount into the oncoming lane at that time is calculated. Next, if the veering-off estimation amount of the vehicle is equal to or larger than a predetermined value, a safety inter-vehicle distance of those vehicles is calculated which, when they decelerate at respective predetermined decelerations, allows the relative velocity therebetween to be a predetermined velocity just before collision. If the inter-vehicle distance therebetween is smaller than the safety inter-vehicle distance at the present moment, it is estimated that there is a possibility that they will collide.

CITATION LIST

Patent Literature

[PTL 1] Japanese Laid-Open Patent Publication No. H07-14100

SUMMARY OF THE INVENTION

Problems to be Solved by the Invention

However, the vehicle collision preventing apparatus disclosed in Patent Literature 1 cannot estimate the possibility of collision caused by the oncoming vehicle veering off into the travelling lane of the vehicle. In addition, when the vehicle is travelling on a road that is curved (hereinafter, referred to as a "curved road"), a reflection point of an electromagnetic wave radiated from a radar apparatus of the vehicle varies in a vehicle width direction from the left front end toward the right front end of the oncoming vehicle (see FIG. 4). Therefore, it might be difficult to estimate the possibility of collision between the vehicle and the oncoming vehicle.

The present invention has been made in light of the above circumstance. An object of the present invention is to provide an object detection apparatus and an object detection program that are capable of, when a reflection point of an electromagnetic wave radiated from a radar apparatus varies in a vehicle width direction from the left front end toward the right front end of an oncoming vehicle, estimating the movement amount of the reflection point on the oncoming vehicle with high accuracy and using the movement amount for determination of the possibility of collision, in order to appropriately estimate whether or not there is a possibility that a vehicle will collide with the oncoming vehicle, on a curved road or the like.

Solution to the Problems

In order to achieve the above object, the present invention has the following features. The first aspect of the present invention is an object detection apparatus provided in a vehicle, the object detection apparatus including: a relative position detection section configured to radiate an electromagnetic wave to another vehicle present in front of the vehicle, and receive a reflection wave reflected from the other vehicle, thereby detecting the relative position of an electromagnetic wave reflection point on the other vehicle reflecting the electromagnetic wave, with respect to the vehicle; and a movement amount estimation section configured to be capable of, based on the relative position of the electromagnetic wave reflection point with respect to the vehicle, estimating, as continuous values, a movement amount by which the electromagnetic wave reflection point will move on the other vehicle from a predetermined timing until the other vehicle approaches the vicinity of the vehicle, wherein the movement amount is calculated based on a reflection point movement rate which is set in advance in accordance with the relative position, in the vehicle width direction of the vehicle, of the other vehicle with respect to the vehicle.

According to the first aspect, a movement amount by which the electromagnetic wave reflection point will move on the other vehicle from the predetermined timing until the other vehicle approaches the vicinity of the vehicle is estimated as continuous values. That is, the movement amount of the electromagnetic wave reflection point is estimated as continuous values, not as discontinuous values. If the movement amount of the electromagnetic wave reflection point on the other vehicle is estimated as continuous values, it becomes possible to estimate the movement amount with high accuracy, and estimate an influence of the movement of the electromagnetic wave reflection point on determination of collision possibility, with high accuracy. Therefore, according to the first aspect, it is possible to take appropriate measure for the influence on the determination of collision possibility. In addition, the movement amount is calculated based on a reflection point movement rate which is set in advance in accordance with the relative position, in the vehicle width direction of the vehicle, of the other vehicle with respect to the vehicle. Therefore, it is possible to easily calculate the movement amount. It is noted that the "predetermined timing" is not particularly limited, but may be when the relative position detection section has caught the other vehicle, for example. In addition, the relative position detection section detects the relative position, based on data inputted from a radar sensor, for example.

In the second aspect of the present invention based on the first aspect, the position of the electromagnetic wave reflection point on the other vehicle continuously varies in accordance with movement of the other vehicle in a vehicle width direction of the vehicle.

According to the second aspect, the position of the electromagnetic wave reflection point on the other vehicle continuously varies. Specifically, the electromagnetic wave reflection point continuously varies in the vehicle width direction from the left front end toward the right front end of an oncoming vehicle. When the other vehicle moves in the vehicle width direction of the vehicle in an object detection area in front of the vehicle (in particular, when the other vehicle moves in a direction approaching the vehicle), it is highly possible that the other vehicle is travelling on an oncoming lane of a curved road. When the other vehicle travels on an oncoming lane of a curved road, the position of the electromagnetic wave reflection point on the other vehicle continuously varies. According to the second aspect, it is possible to estimate the continuous variation in the position of the electromagnetic wave reflection point on the other vehicle, with high accuracy.

In the third aspect of the present invention based on the first aspect, the movement amount of the reflection point is calculated as a product of the width of the other vehicle and a reflection point movement rate which is set in advance in accordance with the relative position, in the vehicle width direction of the vehicle, of the other vehicle with respect to the vehicle.

According to the third aspect, it is possible to easily calculate the movement amount of the reflection point.

In the fourth aspect of the present invention based on the first or third aspect, the movement rate increases continuously or in a step-by-step manner as the distance between the electromagnetic wave reflection point and the vehicle increases.

According to the fourth aspect, it is possible to accurately calculate the movement amount of the reflection point. That is, it is expected that the longer the distance between the electromagnetic wave reflection point and the vehicle is, the larger the movement amount of the reflection point is. Therefore, if the reflection point movement rate is increased as the distance between the electromagnetic wave reflection point and the vehicle increases, the reflection point movement amount can be calculated with high accuracy.

In the fifth aspect of the present invention based on the fourth aspect, the distance is a distance in the vehicle width direction of the vehicle.

According to the fifth aspect, it is possible to accurately calculate the movement amount of the reflection point. That is, it is expected that the longer the distance between the electromagnetic wave reflection point and the vehicle in the vehicle width direction of the vehicle is, the more largely the direction of the other vehicle varies and the larger the movement amount of the reflection point is. Therefore, if the reflection point movement rate is increased as the distance between the electromagnetic wave reflection point and the vehicle in the vehicle width direction of the vehicle increases, the reflection point movement amount can be calculated with high accuracy.

In the sixth aspect of the present invention based on the sixth fourth aspect, the distance is a distance in the vehicle length direction of the vehicle.

According to the eighth sixth aspect, it is possible to calculate the movement amount of the reflection point with high accuracy. That is, it is expected that the longer the distance between the electromagnetic wave reflection point and the vehicle in the vehicle length direction of the vehicle is, the larger the movement amount of the reflection point is. Therefore, if the reflection point movement rate is increased as the distance between the electromagnetic wave reflection point and the vehicle in the vehicle length direction of the vehicle increases, the reflection point movement amount can be calculated with high accuracy.

In the seventh aspect of the present invention based on any one of the first to sixth aspects, the other vehicle is an oncoming vehicle travelling on an oncoming lane with respect to a travelling lane on which the vehicle travels.

According to the seventh aspect, a movement amount by which the electromagnetic wave reflection point will move on the other object travelling on an oncoming lane from the predetermined timing until the other vehicle approaches the vicinity of the vehicle is estimated as continuous values. Therefore, according to the seventh aspect, it is possible to estimate, with high accuracy, an influence of the movement of the electromagnetic wave reflection point on determination of the possibility of collision between the vehicle and the oncoming vehicle.

In the eighth aspect of the present invention based on any one of the first to seventh aspects, the object detection apparatus further includes: a collision determination section configured to determine whether or not there is a possibility that the vehicle will collide with the other vehicle, based on the position of the electromagnetic wave reflection point and a collision determination reference that is set in advance. The collision determination section adjusts the collision determination reference, based on the movement amount of the reflection point.

According to the eighth aspect, the collision determination reference is adjusted based on the movement amount of the reflection point. Therefore, it is possible to prevent erroneous collision determination due to the movement of the reflection point.

In the ninth aspect of the present invention based on the eighth aspect, the object detection apparatus further includes: a center line generation section configured to generate a virtual center line, based on the position of the vehicle and the position; a center line correction section configured to perform correction processing for moving the virtual center line toward the vehicle by the movement amount of the reflection point; and an entry determination section configured to determine whether or not the other vehicle has crossed the virtual center line that has been corrected, and has entered the travelling lane. If the entry determination section has determined that the other vehicle has entered the travelling lane, the collision determination section determines that there is a possibility that the vehicle will collide with the other vehicle.

According to the ninth aspect, whether or not the other vehicle has crossed the virtual center line to enter the travelling lane is determined, and the risk of collision is determined based on the determination result. Therefore, even if a center line is not drawn on a road, it is possible to accurately determine the risk of collision.

The tenth aspect of the present invention is an object detection program for detecting an object approaching a vehicle, the object detection program causing a computer provided in the vehicle to function as: a relative position detection section configured to detect the relative position, with respect to the vehicle, of an electromagnetic wave reflection point on another vehicle reflecting an electromagnetic wave radiated forward from a radar apparatus provided in the vehicle; and a movement amount estimation section configured to be capable of, based on the relative position of the electromagnetic wave reflection point with respect to the vehicle, estimating, as continuous values, a movement amount by which the electromagnetic wave reflection point will move on the other object from a predetermined timing until the other object approaches the vicinity of the vehicle, wherein the movement amount is calculated based on a reflection point movement rate which is set in advance in accordance with the relative position, in the vehicle width direction of the vehicle, of the other vehicle with respect to the vehicle.

According to the tenth aspect, a movement amount by which the electromagnetic wave reflection point will move on the other vehicle from the predetermined timing until the other vehicle approaches the vicinity of the vehicle is estimated as continuous values. If the movement amount of the electromagnetic wave reflection point on the other vehicle is estimated as continuous values, it becomes possible to accurately estimate the movement amount with high accuracy, and estimate an influence of the movement of the electromagnetic wave reflection point on determination of collision possibility. Therefore, according to the tenth aspect, it is possible to take appropriate measure for the influence on the determination of collision possibility. In addition, the movement amount is calculated based on a reflection point movement rate which is set in advance in accordance with the relative position, in the vehicle width direction of the vehicle, of the other vehicle with respect to the vehicle. Therefore, it is possible to easily calculate the movement amount.

Advantageous Effects of the Invention

According to the present invention, it is possible to estimate the movement amount of a reflection point on an object (oncoming vehicle) with high accuracy when the reflection point of an electromagnetic wave radiated from a radar apparatus varies in a vehicle-width direction from the left front end to the right front end of the object (oncoming vehicle), and using the movement amount for determination of the possibility of collision, in order to appropriately estimate whether or not a vehicle will collide with the object (oncoming vehicle) on a curved road or the like.

BRIEF DESCRIPTION OF THE DRAWINGS

FIG. 6 shows an example of the relationship between a reflection point movement rate ρ and a distance X between the electromagnetic wave reflection point and a vehicle VC1 in the vehicle width direction (X-axis direction) of the vehicle VC1.

DESCRIPTION OF EMBODIMENTS

Figure 1:
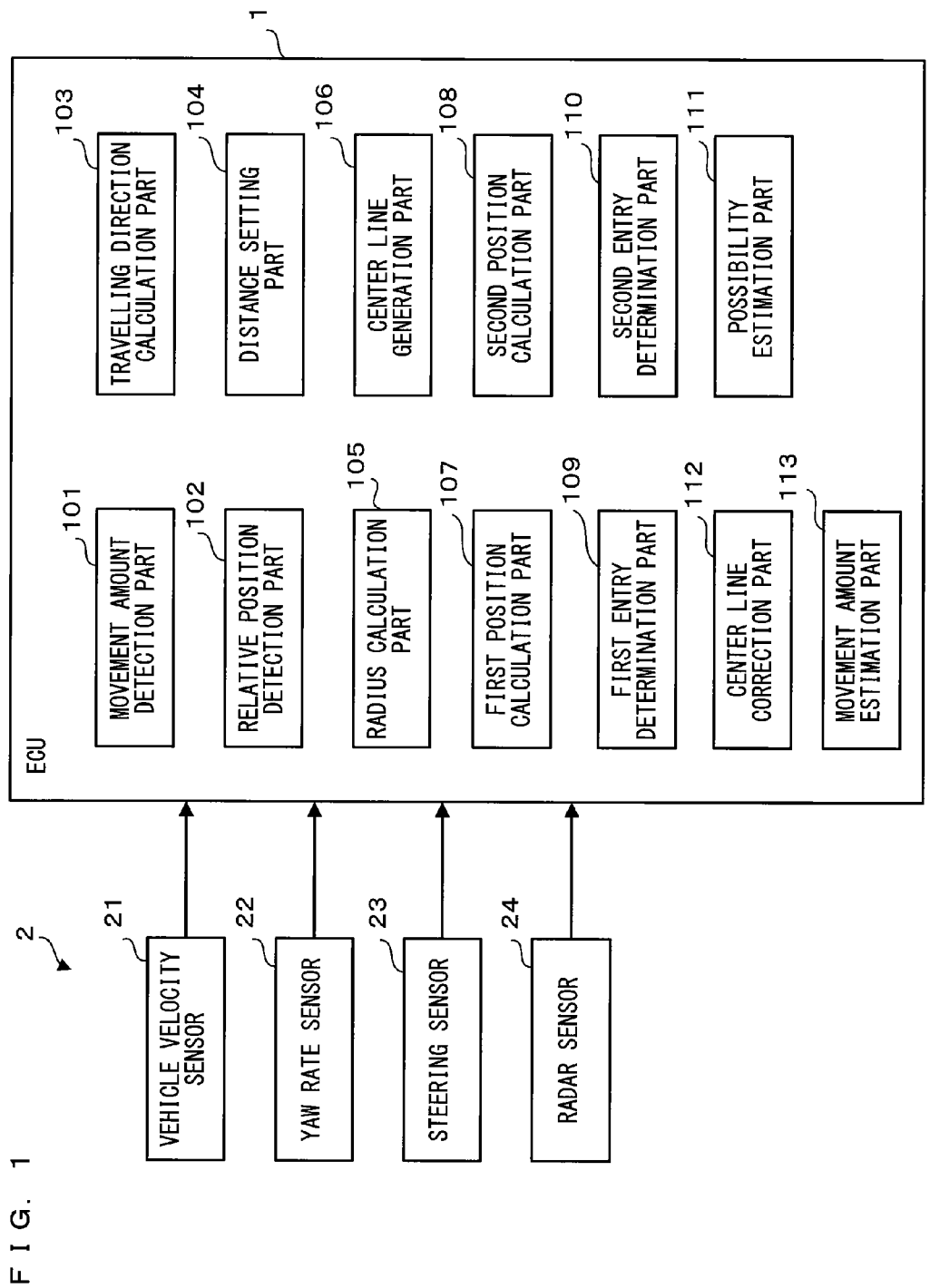
FIG. 1 is a block diagram showing an example of the configuration of a collision estimation apparatus according to the present invention.

Hereinafter, an embodiment of an object detection apparatus according to the present invention will be described with reference to the drawings. FIG. 1 is a block diagram showing an example of the configuration of the object detection apparatus according to the present invention. As shown in FIG. 1, an object detection ECU (Electronic Control Unit) 1 (which corresponds to the object detection apparatus) according to the present invention is connected to an input device 2 as peripheral equipment in a communicable manner.

First, with reference to FIG. 1, the input device 2 of the object detection ECU1 will be described. The input device 2 includes a vehicle velocity sensor 21, a yaw rate sensor 22, a steering sensor 23, and a radar sensor 24. The vehicle velocity sensor 21 is a sensor for detecting a vehicle velocity, and outputs a signal indicating the vehicle velocity to the object detection ECU 1.

The yaw rate sensor 22 is a sensor composed of a rate gyro and the like, for detecting a yaw rate which indicates the speed of variation in yaw angle (a rotation angle velocity around a vertical axis passing through the center of gravity of a vehicle), and outputs a signal indicating the yaw rate to the object detection ECU1. The steering sensor 23 is a sensor for detecting a steering angle, and outputs a signal indicating a steering angle to the object detection ECU1.

The radar sensor 24 is a sensor (for example, a millimeter-wave radar) for detecting the relative position and the relative velocity with respect to an oncoming vehicle, and outputs a signal indicating a relative position and a relative velocity to the object detection ECU1.

Figure 2:
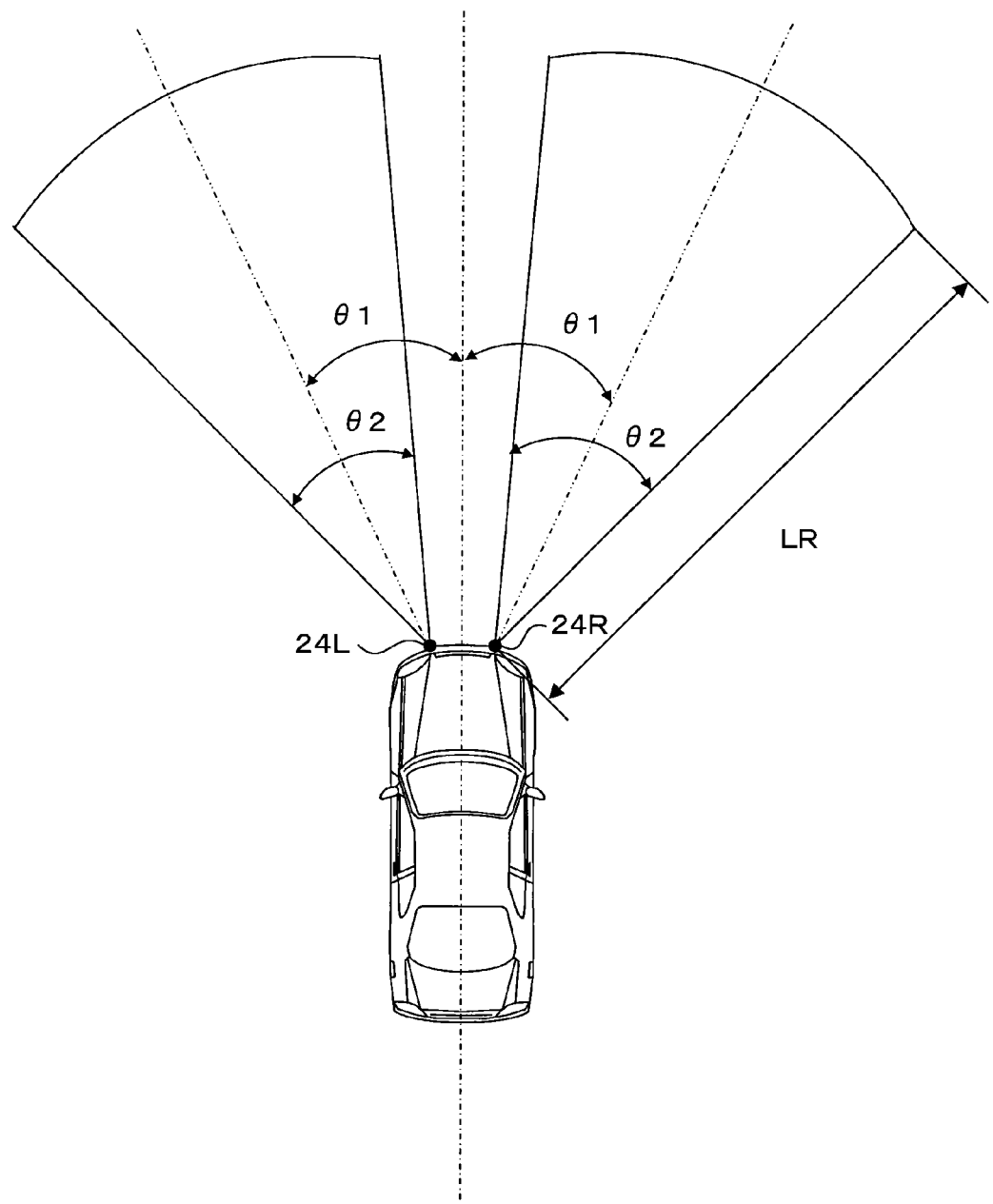
FIG. 2 is a plane diagram showing an example of a detection range of a radar sensor.

FIG. 2 is a plane diagram showing an example of a detection range of the radar sensor 24. Two radar sensors 24 (24R and 24L) are provided at the front end portion of the vehicle, arranged in the vehicle width direction. Each of the radar sensors 24R and 24L is capable of detecting a range (a sector area in the drawing) of a predetermined spread angle θ2 (for example, 40°) centered in the direction (a two-dotted and dashed line in the drawing) inclined rightward (or leftward) by a predetermined angle θ1 (for example, 25°) from the center line (a dotted-dashed line in the drawing) extending along the front-back direction of the vehicle, within a detection possible distance LR (for example, 30 m) from each of the radar sensors 24R and 24L.

In the present embodiment, the case where two radar sensors 24 are provided in the vehicle will be described. However, only one radar sensor 24 may be provided, or three or more radar sensors 24 may be provided.

Next, with reference to FIG. 1, the function configuration of the object detection ECU1 will be described. The object detection ECU1 functionally includes a movement amount detection part 101, a relative position detection part 102, a travelling direction calculation part 103, a distance setting part 104, a radius calculation part 105, a center line generation part 106, a first position calculation part 107, a second position calculation part 108, a first entry determination part 109, a second entry determination part 110, a possibility estimation part 111, a center line correction part 112, and a movement amount estimation part 113.

It is noted that the object detection ECU1 causes a microcomputer (which corresponds to a computer) provided at an appropriate position in the object detection ECU1 to execute a control program stored in advance in a ROM (Read Only Memory) or the like provided at an appropriate position in the object detection ECU1, thereby functionally causing the microcomputer to function as function sections such as the movement amount detection part 101, the relative position detection part 102, the travelling direction calculation part 103, the distance setting part 104, the radius calculation part 105, the center line generation part 106, the first position calculation part 107, the second position calculation part 108, the first entry determination part 109, the second entry determination part 110, the possibility estimation part 111, the center line correction part 112, and the movement amount estimation part 113.

The movement amount detection part 101 is a function part for detecting the velocity of the vehicle by the vehicle velocity sensor 21 and the travelling direction of the vehicle by the yaw rate sensor 22 and the steering sensor 23, every predetermined time (for example, 100 msec).

In the present embodiment, the case where the movement amount detection part 101 detects the travelling direction of the vehicle by the yaw rate sensor 22 and the steering sensor 23 will be described. However, the movement amount detection part 101 may detect the travelling direction of the vehicle by one of the yaw rate sensor 22 and the steering sensor 23.

The relative position detection part 102 (which corresponds to a relative position detection section) is a function part for detecting the relative position of an oncoming vehicle with respect to the vehicle by the radar sensor 24, every predetermined time (for example, 100 msec). Thus, since the relative position detection part 102 detects the relative position of an oncoming vehicle by the radar sensor 24, it is possible to accurately detect the relative position with a simple configuration.

The center line generation part 106 (which corresponds to a center line generation section) is a function part for generating, at a predetermined timing, a reference line CL1 between the vehicle VC1 and the oncoming vehicle VC2 in a ground fixed coordinate system, based on the travelling direction detected by the movement amount detection part 101 and the relative position detected by the relative position detection part 102, the reference line CL1 being used as a base for a reference line CL2 defining a virtual center line. The reference line CL2 is generated by correction (offset processing) of the reference line CL1 defining a virtual center line. The reference line CL2 is used as a determination reference for collision possibility.

It is noted that the term "reference line" defining a virtual center line includes a straight line and a curved line. That is, the term "reference line" includes, for example, a straight line, an arc, a quadratic curve, and the like. Therefore, the present invention is not limited to the case where the vehicle VC1 is travelling on a curved road which will be described in the present embodiment. The present invention is also applicable to the case where the vehicle VC1 is travelling on a straight road (linear road) or the like.

Figure 3:
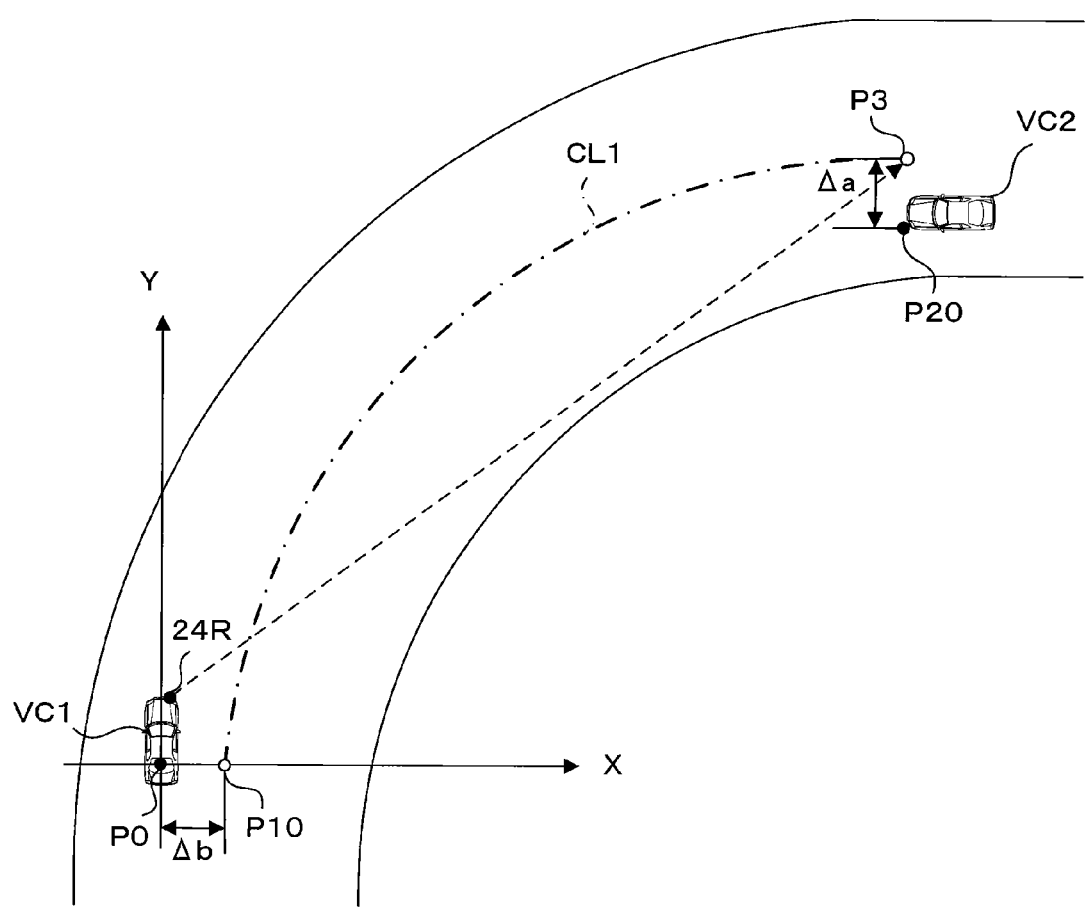
FIG. 3 is a plane diagram showing an example of a reference line CL defining a virtual center line, generated by a center line generation part.

FIG. 3 is a plane diagram showing an example of the reference line CL1 defining a virtual center line, generated by the center line generation part 106. In the present embodiment, the case where the vehicle VC1 is travelling on a right-hand curve will be described. At a timing just after the radar sensor 24R has caught the oncoming vehicle VC2, the center line generation part 106 generates the reference line CL1, based on the travelling direction detected by the movement amount detection part 101 and the relative position detected by the relative position detection part 102. It is noted that the center line generation part 106 generates the reference line CL1 in a ground fixed coordinate system (which corresponds to a coordinate system) whose base (here, the origin) is a position P0 of the vehicle VC1 as it is at a timing when the radar sensor 24R has caught the oncoming vehicle VC2.

That is, in the present embodiment, the coordinate system is a ground fixed coordinate system whose origin is the position P0 (here, the middle position between both back wheels of the vehicle VC1) of the vehicle VC1, having a coordinate axis in the travelling direction of the vehicle VC1 (here, Y-axis), and another coordinate axis in the vehicle width direction of the vehicle VC1 (here, X-axis).

Thus, since the reference line CL1 defining a virtual center line is generated in the ground fixed coordinate system based on the position P0 of the vehicle VC1 as it is at a predetermined timing, it is possible to generate the reference line CL1 defining a virtual center line with a simple configuration.

That is, the ground fixed coordinate system whose base (here, the origin) is the position P0 of the vehicle VC1 can be generated with a simple configuration, by setting the travelling direction of the vehicle VC1 as one (here, Y-axis) of the coordinate axes and the width direction of the vehicle as the other one (here, X-axis), as shown in FIG. 3. Therefore, the reference line CL1 defining a virtual center line can be generated with a simple configuration.

In the present embodiment, the case where the coordinate system is a ground fixed coordinate system will be described. However, the coordinate system may be another type of coordinate system. For example, the coordinate system may be based on the position of the vehicle VC1. In this case, it is necessary to move the reference line CL1 generated by the center line generation part 106, on the coordinate system, in accordance with variation in the position of the vehicle VC1 occurring after the timing when the radar sensor 24R has caught the oncoming vehicle VC2.

In the present embodiment, the case where the center line generation part 106 generates the reference line CL1 at a timing when the radar sensor 24R has caught the oncoming vehicle VC2, will be described. However, the center line generation part 106 may generate the reference line CL1 at a timing when the radar sensor 24R has caught the oncoming vehicle VC2 and a relative distance corresponding to the relative position detected by the relative position detection part 102 has become equal to or smaller than a predetermined distance (for example, 20 m). In this case, by setting the predetermined distance at an appropriate value, it becomes possible to estimate whether or not there is a possibility of collision with the oncoming vehicle, at an appropriate timing.

Figure 5:
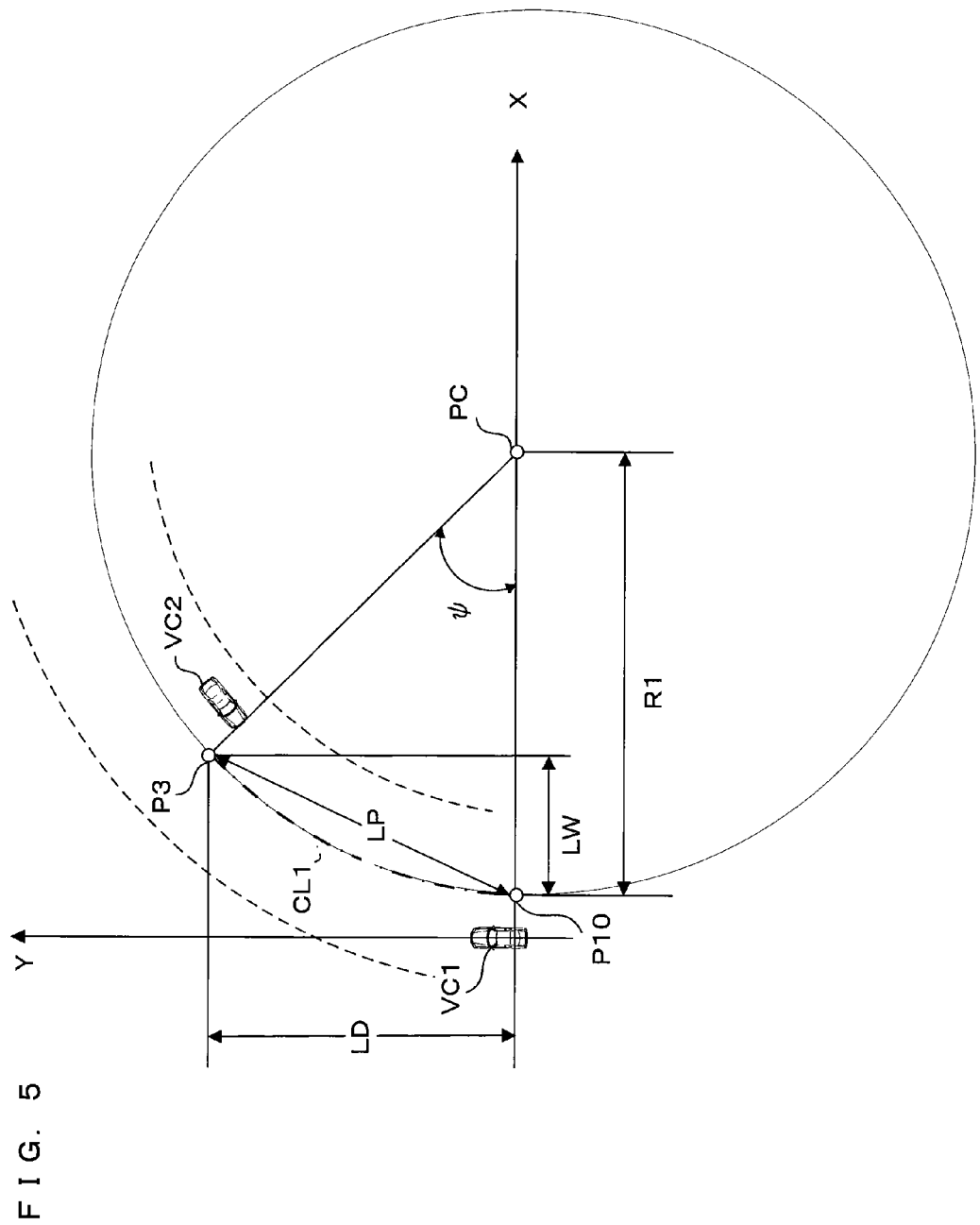
FIG. 5 is a plane diagram illustrating an example of a calculation method for a radius R by a radius calculation part.

Further, the center line generation part 106 generates, as the reference line CL1, an arc CL1 having a radius R1 calculated by the radius calculation part 105 (see FIG. 5). In addition, the center line generation part 106 generates the arc CL1 as the reference line CL1, one of the ends of the arc CL1 being a vehicle side end point P10 which is a position separated toward the oncoming lane in the vehicle width direction of the vehicle VC1 by an offset $\Delta b$ set by the distance setting part 104 from the position P0 of the vehicle VC1 as it is at a timing (the predetermined timing) when the radar sensor 24R has caught the oncoming vehicle VC2, and the other one of the ends of the arc CL1 being an oncoming vehicle side end point P3 which is a position separated toward the travelling lane in the vehicle width direction of the oncoming vehicle VC2 by an offset $\Delta a$ set by the distance setting part 104 from an electromagnetic wave reflection point P20 (see FIG. 3) of the oncoming vehicle VC2 as it is at the predetermined timing.

Here, the offset $\Delta b$ is a distance by which the vehicle VC1 is separated in the vehicle width direction from the reference line CL1 defining the virtual center line, and the offset $\Delta a$ is a distance by which the electromagnetic wave reflection point P20 of the oncoming vehicle VC2 is separated in the vehicle width direction from the reference line CL1 defining the virtual center line. The offsets Δa and Δb are set by the distance setting part 104 as described later. The offset Δb is set in advance to be the sum of the half of the lane width (for example, 2 m) and the movement amount of the reflection point on the oncoming vehicle VC2, for example. The width of the oncoming vehicle VC2 may be set to be that of a general passenger vehicle, for example. The offset Δa is set in advance to be the sum of the half of the lane width (for example, 2 m) and the movement amount of the reflection point on the oncoming vehicle VC2, for example. The width of the oncoming vehicle VC2 may be set to be that of a general passenger vehicle, for example.

Thus, the predetermined timing (timing of detecting the travelling direction and the relative position for generating the reference line CL1 defining a virtual center line) is when the radar sensor 24 has caught the oncoming vehicle VC2. Therefore, it is possible to estimate whether or not there is a possibility of collision with the oncoming vehicle VC2 as early as possible.

In the present embodiment, the case where the predetermined timing is when the radar sensor 24 has caught the oncoming vehicle VC2 will be described. However, the predetermined timing may be another timing. For example, the predetermined timing may be when the radar sensor 24 has caught the oncoming vehicle VC2 and it has been determined that the travelling direction detected by the movement amount detection part 101 is inclined by a predetermined angle or more from the straight direction (that is, the vehicle VC1 is travelling on a curved road). In this case, the reference line CL1 defining a virtual center line can be generated at a more appropriate timing.

That is, for example, in the case where there is a straight road before a curved road and the radar sensor 24 has caught the oncoming vehicle VC2 present diagonally in front while the vehicle VC1 is travelling on the straight road, if the reference line CL1 defining a virtual center line is generated at a timing when the radar sensor 24 has caught the oncoming vehicle VC2, the reference line CL1 might not be appropriately generated. Therefore, the reference line CL1 defining a virtual center line is generated at a timing when the vehicle VC1 enters the curved road, whereby the reference line CL1 can be appropriately generated.

The travelling direction calculation part 103 is a function part for obtaining the travelling direction of the oncoming vehicle, based on the travelling direction and the travelling velocity of the vehicle detected by the movement amount detection part 101, and the relative position detected by the relative position detection part 102. For example, first, the travelling direction calculation part 103 obtains a travelling vector indicating the travelling direction and the travelling velocity of the vehicle from the travelling direction and the travelling velocity of the vehicle detected by the movement amount detection part 101. In addition, the travelling direction calculation part 103 obtains a relative velocity vector from the temporal variation in the relative position detected by the relative position detection part 102. Then, the travelling direction calculation part 103 obtains a travelling vector of the oncoming vehicle by the sum of the travelling vector of the vehicle and the relative velocity vector, and obtains the direction of the travelling vector of the oncoming vehicle, as the travelling direction of the oncoming vehicle.

The distance setting part 104 is a function part for setting the offsets Δa and Δb, based on the movement amount of an electromagnetic wave reflection point on the oncoming vehicle VC2 estimated by the movement amount estimation part 113, the lane width, and the like.

Figure 4:
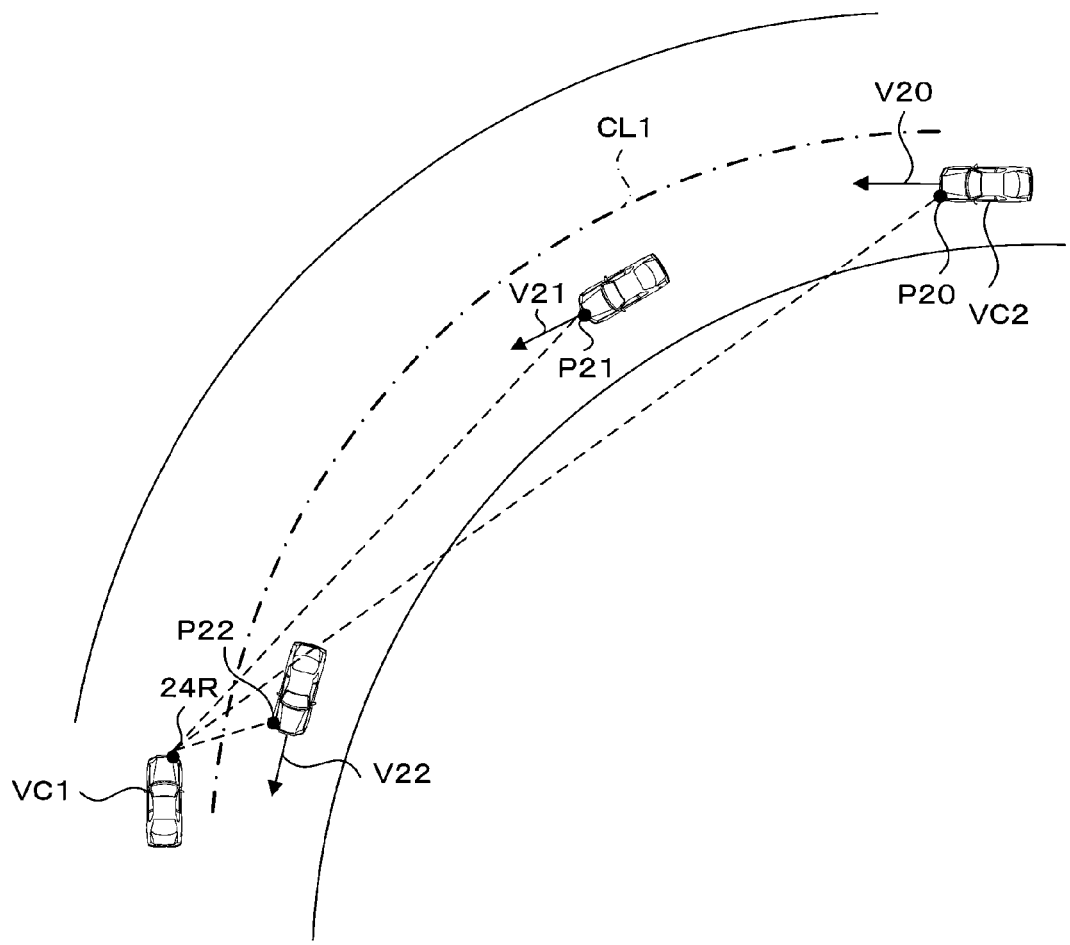
FIG. 4 shows the variation in the position of an electromagnetic wave reflection point in the vehicle width direction from the left front end toward the right front end of an oncoming vehicle VC2.

FIG. 4 is a plane diagram showing the variation in the position of the reflection point on the oncoming vehicle VC2. In the radar sensor 24R, the position on the oncoming vehicle VC2, whose distance from the radar sensor 24R is the shortest, is detected as the reflection point of the radar wave (the position indicated by a filled circle mark in the drawing). Therefore, as shown in FIG. 4, the position of the reflection point varies in the vehicle width direction from the left front end toward the right front end of the oncoming vehicle VC2 as shown by the reflection points P20, P21, and P22, along with the progress of the oncoming vehicle VC2.

Therefore, even in the case where the oncoming vehicle VC2 is travelling on the center of the oncoming lane with respect to the width direction, the relative position of the oncoming vehicle VC2 detected via the radar sensor 24 by the relative position detection part 102 indicates approaching the travelling lane of the vehicle VC1. Thus, the actual travelling direction of the oncoming vehicle VC2 is different from the detected travelling direction thereof.

Here, the virtual center line CL1 is set between the travelling lane of the vehicle VC1 and the oncoming lane. Then, it will be assumed that if an electromagnetic wave reflection point on the oncoming vehicle VC2 has crossed the virtual center line CL1 toward the travelling lane of the vehicle VC1, it is determined that there is a possibility that the vehicle VC1 will collide with the oncoming vehicle VC2. If the position of the reflection point varies in the vehicle width direction from the left front end toward the right front end of the oncoming vehicle VC2 as shown by the reflection points P20, P21, and P22 in FIG. 4, the position of the reflection point approaches the virtual center line CL1 as approaching the vehicle VC1. Thus, the reflection point is likely to cross the virtual center line CL1 toward the travelling lane of the vehicle VC1. Even though actually it is not likely that the vehicle VC1 and the oncoming vehicle VC2 will collide with each other, it might be erroneously determined that there is a high possibility of collision. Therefore, in view of the variation in the position of the reflection point in the vehicle width direction from the left front end toward the right front end of the oncoming vehicle VC2, it is necessary to perform correction (offset processing) for moving the position of the virtual center line CL1 set when the reflection point P20 has been detected, toward the travelling lane of the vehicle VC1.

Therefore, in the present embodiment, the position of the virtual center line CL1 is subjected to offset processing to move toward the travelling lane of the vehicle VC1, so that an influence of the movement of the reflection point is absorbed.

The movement amount estimation part 113 (which corresponds to a movement amount estimation section) estimates at which portion of the oncoming vehicle VC2 an electromagnetic wave is reflected, based on the electromagnetic wave reflection point and the relative position of the vehicle VC1, and estimates, as continuous values, the movement amount by which the electromagnetic wave reflection point will move on the oncoming vehicle VC2 from a predetermined timing until the oncoming vehicle VC2 approaches the vicinity of the vehicle VC1 (for example, the reflection point on the other vehicle VC2 approaches a position just beside the vehicle VC1). The above "predetermined timing" is not particularly limited, but may be when the radar sensor 24R has caught the oncoming vehicle VC2, for example. It is noted that a reflection point movement amount S is calculated as a product of a vehicle width W of the oncoming vehicle VC2 and a reflection point movement rate p which is set in advance in accordance with the relative position, in the vehicle width direction of the vehicle VC1, of the oncoming vehicle VC2 with respect to the vehicle VC1. That is, the movement amount S of the electromagnetic wave reflection point is obtained by the following expression 1.

$$S = W \times \rho \quad (1)$$

Here, W is the maximum width of the reflection point movement (the width of the oncoming vehicle VC2). As previously described, the width of the oncoming vehicle VC2 may be set as the width of a general passenger vehicle, for example. The character ρ is the reflection point movement rate. A method for setting the value of ρ is not particularly limited. For example, ρ may be set to increase continuously or in a step-by-step manner as the distance between the electromagnetic wave reflection point and the vehicle VC1 increases. That is, it is expected that the longer the distance between the electromagnetic wave reflection point and the vehicle VC1 is, the larger the reflection point movement amount is. Therefore, if the reflection point movement rate ρ is increased as the distance between the electromagnetic wave reflection point and the vehicle VC1 increases, the reflection point movement amount can be accurately calculated.

It is noted that the distance between the electromagnetic wave reflection point and the vehicle VC1 may be the distance in the vehicle width direction of the vehicle VC1, for example. This is because it is expected that the longer the distance between the electromagnetic wave reflection point and the vehicle in the vehicle width direction of the vehicle VC1 is, the more largely the direction of the oncoming vehicle VC2 varies until the electromagnetic wave reflection point approaches the vicinity of the vehicle VC1, and as a result, the reflection point movement amount also increases.

Alternatively, the distance between the electromagnetic wave reflection point and the vehicle VC1 may be the distance in the vehicle length direction of the vehicle VC1. This is because it is expected that the longer the distance between the electromagnetic wave reflection point and the vehicle VC1 in the vehicle length direction of the vehicle VC1 is, the larger the amount of the reflection point movement until the electromagnetic wave reflection point approaches the vicinity of the vehicle VC1 is.

A method for obtaining the reflection point movement rate ρ will be described.

FIG. 6 shows an example of the relationship between the reflection point movement rate ρ and a distance X between the electromagnetic wave reflection point and the vehicle VC1 with respect to the vehicle width direction (X-axis direction) of the vehicle VC1. For example, as shown in FIG. 6, the reflection point movement rate ρ can be set such that if X=0, the reflection point movement rate ρ is constant as a predetermined minimum value ρmin; if 0<x≤the predetermined value X1, the reflection point movement rate ρ is constant as ρ1 (>ρmin); if the predetermined value X1<x≤a predetermined value X2, the reflection point movement rate ρ increases from ρ1 as a linear function; and if X>a predetermined value X2, the reflection point movement rate ρ is constant as a predetermined maximum value ρmax. It is noted that the relationship between the reflection point movement rate ρ and the distance X is not limited to the above example.

Figure 7:
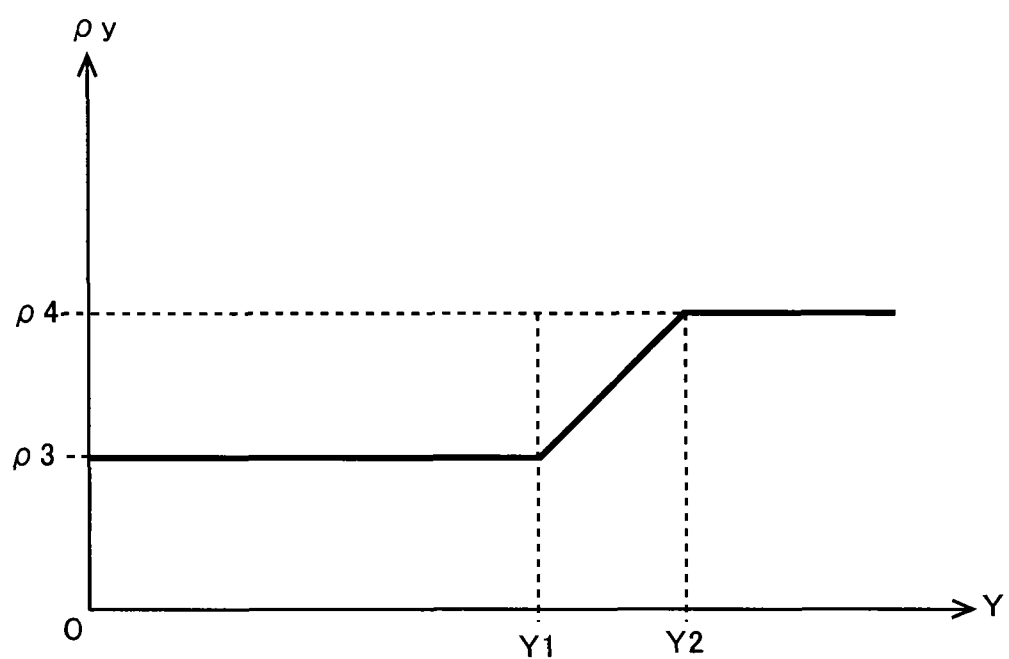
FIG. 7 shows the relationship between a correction amount ρy for the reflection point movement rate ρ, and a distance Y between the electromagnetic wave reflection point and the vehicle VC1 in the vehicle length direction (Y-axis direction) of the vehicle VC1.

Here, when a distance Y between the electromagnetic wave reflection point and the vehicle VC1 with respect to the vehicle length direction (Y-axis direction) of the vehicle VC1 has a value indicated below, the reflection point movement rate ρ obtained in accordance with the distance X is corrected to increase (as shown in a hatched area in FIG. 6). That is, as shown in FIG. 7, if 0≤y≤a predetermined value Y1, a predetermined value ρ3 is added to the reflection point movement rate ρ obtained in accordance with the distance X; if the predetermined value Y1≤y<a predetermined value Y2, a value that increases as a linear function in accordance with the value of Y is added to the reflection point movement rate ρ obtained in accordance with the distance X; and if Y>Y2, a predetermined value ρ4 is added to the reflection point movement rate ρ obtained in accordance with the distance X. It is noted that if the reflection point movement rate ρ after the addition is larger than the predetermined value ρ2 (see FIG. 6), the reflection point movement rate ρ is set at ρ2.

With reference to FIG. 1 again, the function configuration of the object detection ECU1 will be described. The radius calculation part 105 is a function part for obtaining the radius R1 of the arc CL1, based on a distance LP between the vehicle side end point P10 (see FIG. 5) and the oncoming vehicle side end point P3, and a distance LW between the vehicle side end point P10 and the foot of a perpendicular from the oncoming vehicle side end point P3 to a width direction coordinate axis (here, X-axis) of the coordinate system. Specifically, the radius calculation part 105 obtains the radius R1 of the arc CL1 by the following expression (2).

$$R1 = LP^2/(2 \times LW) \quad (2)$$

FIG. 5 is a plane diagram illustrating an example of a calculation method for the radius R1 by the radius calculation part 105. The distance LW is represented by the following expression (3), using an angle ψ between the X-axis and a line segment connecting the oncoming vehicle side end point P3 and a center point PC of the arc CL1, from the geometric relationship shown in the drawing.

$$LW = R1 \times (1 - \cos \psi) \quad (3)$$

Here, the Taylor series to second order at ψ=0 of a function of (1−cos ψ) is (ψ²/2). Therefore, if the angle ψ is small, the following expression (4) is obtained.

$$LW \approx R1 \times (\psi^2/2) \quad (4)$$

In addition, if the angle ψ is small, the following expression (5) is obtained.

$$\psi \approx \sin \psi = LD/R \approx LP/R1 \quad (5)$$

The expression (5) is substituted to the expression (4) to obtain the expression (6).

$$W = R1 \times LP^2/(2 \times R1^2) = LP^2/(2 \times R1) \quad (6)$$

The above expression (2) is obtained from the expression (6).

Thus, the radius R1 is appropriately obtained with simple calculation by the above expression (2), based on the distance LP between the vehicle side end point P10 and the oncoming vehicle side end point P3, and the distance LW between the vehicle side end point P10 and the foot of a perpendicular from the oncoming vehicle side end point P3 to the width direction coordinate axis of the coordinate system.

Next, offset processing for the position of the virtual center line to move toward the travelling lane of the vehicle VC1 will be described. As previously described, the reason why the virtual center line is subjected to the offset processing is to absorb the influence on determination of collision possibility, caused by variation in the position of the electromagnetic wave reflection point in the vehicle width direction from the left front end to the right front end of the oncoming vehicle VC2.

Figure 8:
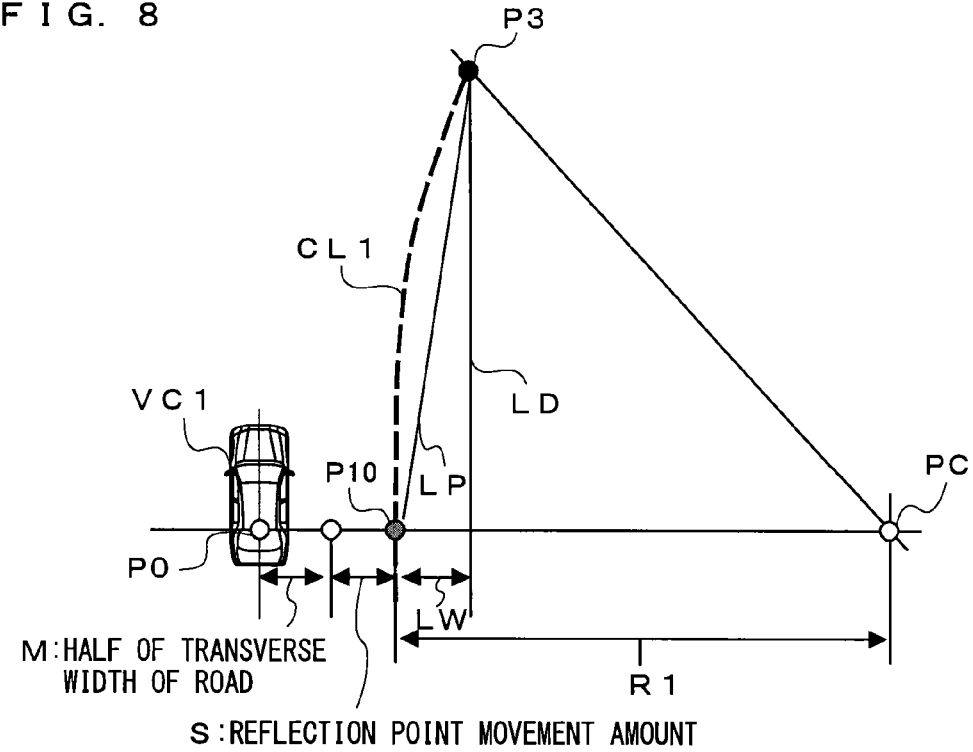
FIG. 8 shows a virtual center line that is yet to be subjected to offset processing.

FIG. 8 shows the virtual center line that is yet to be subjected to the offset processing. As shown in FIG. 8, the virtual center line CL1 which is yet to be subjected to the offset processing is the arc CL1, one end of which is the vehicle side end point P10 which is a position separated toward the oncoming lane in the vehicle width direction of the vehicle VC1 by the offset Δb from the position P0 of the vehicle VC1 as it is at the predetermined timing, and the other end of which is the oncoming vehicle side end point P3 which is a position separated toward the travelling lane in the vehicle width direction of the oncoming vehicle VC2 by the offset Δa from the electromagnetic wave reflection point P20 of the oncoming vehicle VC2 as it is at the predetermined timing, as described with reference to FIG. 3.

Figure 9:
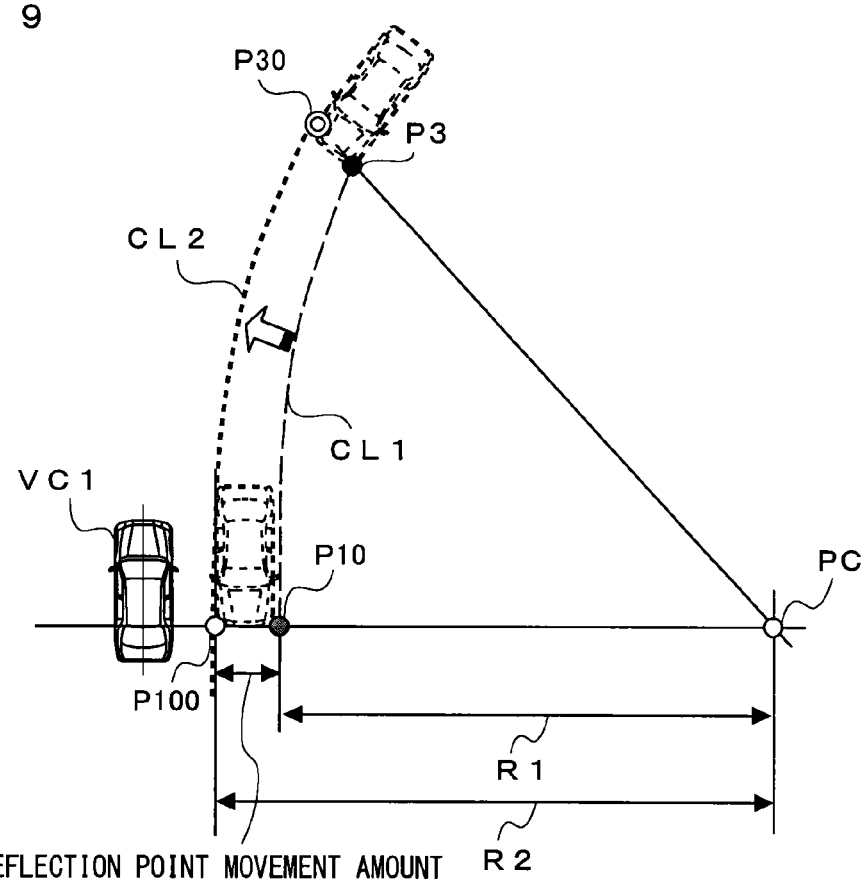
FIG. 9 shows a virtual center line that has been subjected to the offset processing.

In the present embodiment, as shown in FIG. 9, the virtual center line as the arc CL1 is subjected to offset processing to move by the above reflection point movement amount S toward the travelling lane of the vehicle VC1. By the offset processing, the arc CL1 is moved toward the travelling lane of the vehicle VC1. In FIG. 9, P3 moves to P30, and P10 moves to P100. The radius R1 of the arc CL1 is $LP^2/(2 \times LW)$. By the offset processing, the arc CL1 becomes the arc CL2 with a radius R2. The radius R2 of the arc CL2 is larger by S (=W×ρ) than the radius of the arc CL1 which is yet to be subjected to the offset processing, that is, the radius R2 is $LP^2/(2 \times LW)+S$. By the offset processing, the following effect is provided. That is, even if the position of the electromagnetic wave reflection point varies in the vehicle width direction from the left front end to the right front end of the oncoming vehicle VC2 as the oncoming vehicle VC2 travels, since the virtual center line is subjected to offset processing to move toward the travelling lane of the vehicle VC1 by the variation in the position (by the reflection point movement amount S), the electromagnetic wave reflection point is unlikely to cross the virtual center line when the reflection point moves. Therefore, it becomes possible to prevent erroneous determination of collision possibility due to the movement of the reflection point.

With reference to FIG. 1 again, the function configuration of the object detection ECU1 will be described. The first position calculation part 107 is a function part for obtaining the position of the electromagnetic wave reflection point, in the ground fixed coordinate system, based on the travelling direction and the travelling velocity of the vehicle VC1 detected by the movement amount detection part 101, and the relative position of the electromagnetic wave reflection point detected by the relative position detection part 102.

The second position calculation part 108 is a function part for obtaining the position of the vehicle VC1, in the ground fixed coordinate system, based on the travelling direction and the travelling velocity of the vehicle VC1 detected by the movement amount detection part 101.

The first entry determination part 109 (which corresponds to a first entry determination section) is a function part for determining whether or not the oncoming vehicle VC2 has crossed the virtual center line subjected to the offset processing and has entered the travelling lane, based on the position of the electromagnetic wave reflection point obtained by the first position calculation part 108.

Figure 10:
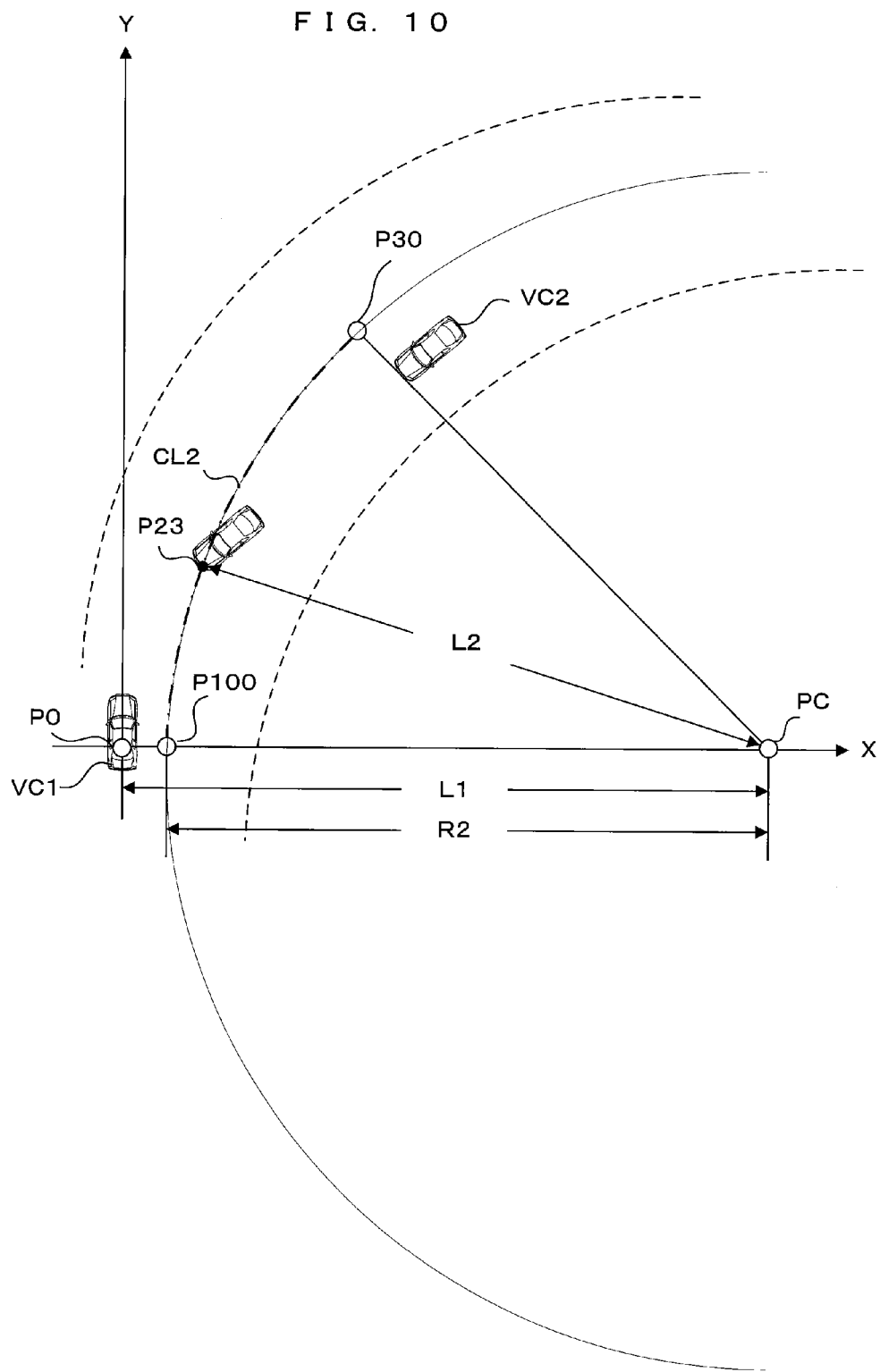
FIG. 10 shows an example of the magnitude relationship among: a distance L1 between the position of the vehicle VC1 and the center position PC of the arc CL2 which has been subjected to the offset processing; a distance L2 between a position P23 of the electromagnetic wave reflection point and the center position PC of the arc CL2 which has been subjected to the offset processing; and a radius R2 of the arc CL2 which has been subjected to the offset processing.

FIG. 10 is a plane diagram illustrating an example of a determination method by the first entry determination part 109. As shown in FIG. 10, the first entry determination part 109 obtains a distance L2 between a position P23 of the electromagnetic wave reflection point in the ground fixed coordinate system and the center position PC of the arc CL2 which has been subjected to the offset processing, and determines whether or not the oncoming vehicle VC2 has crossed the virtual center line to enter the travelling lane of the vehicle VC1, based on whether or not the obtained distance L2 is larger than the radius R2 of the arc CL2 which has been subjected to the offset processing. That is, if the distance L2 is larger than the radius R2 which has been subjected to the offset processing, the first entry determination part 109 determines that the oncoming vehicle VC2 has entered the travelling lane.

Thus, it is possible to determine whether or not the oncoming vehicle VC2 has crossed the virtual center line to enter the travelling lane, in accordance with whether or not the distance L2 between the position P23 of the oncoming vehicle VC2 in the ground fixed coordinate system and the center position PC of the arc CL2 is larger than the radius R2 which has been subjected to the offset processing. Therefore, it is possible to easily and accurately determine whether or not the oncoming vehicle VC2 has crossed the virtual center line which has been subjected to the offset processing to enter the travelling lane, on a curved road or the like.

With reference to FIG. 1 again, the function configuration of the object detection ECU1 will be described. The second entry determination part 110 is a function part for determining whether or not the vehicle VC1 has crossed the vertical center line that has been subjected to the offset processing and has entered the oncoming lane, based on the position of the vehicle VC1 obtained by the second position calculation part 108. Specifically, the second entry determination part 110 obtains a distance L1 (see FIG. 10) between the position of the vehicle VC1 in the ground fixed coordinate system and the center position PC of the arc CL2 which has been subjected to the offset processing, and determines whether or not the vehicle VC1 has crossed the virtual center line that has been subjected to the offset processing to enter the oncoming lane, based on whether or not the obtained distance L1 is larger than the radius R2 of the arc CL2 which has been subjected to the offset processing. That is, if the distance L1 between the position of the vehicle VC1 and the center position PC of the arc CL2 which has been subjected to the offset processing is smaller than the radius R2, the second entry determination part 110 determines that the vehicle VC1 has entered the oncoming lane.

The possibility estimation part 111 (which corresponds to a possibility estimation section) is a function part for determining that there is a possibility of collision with the oncoming vehicle VC2, when the first entry determination part 109 has determined that the oncoming vehicle VC2 has entered the travelling lane of the vehicle VC1. In addition, the possibility estimation part 111 determines that there is a possibility of collision with the oncoming vehicle VC2, when the second entry determination part 110 has determined that the vehicle VC1 has entered the oncoming lane.

Figure 11:
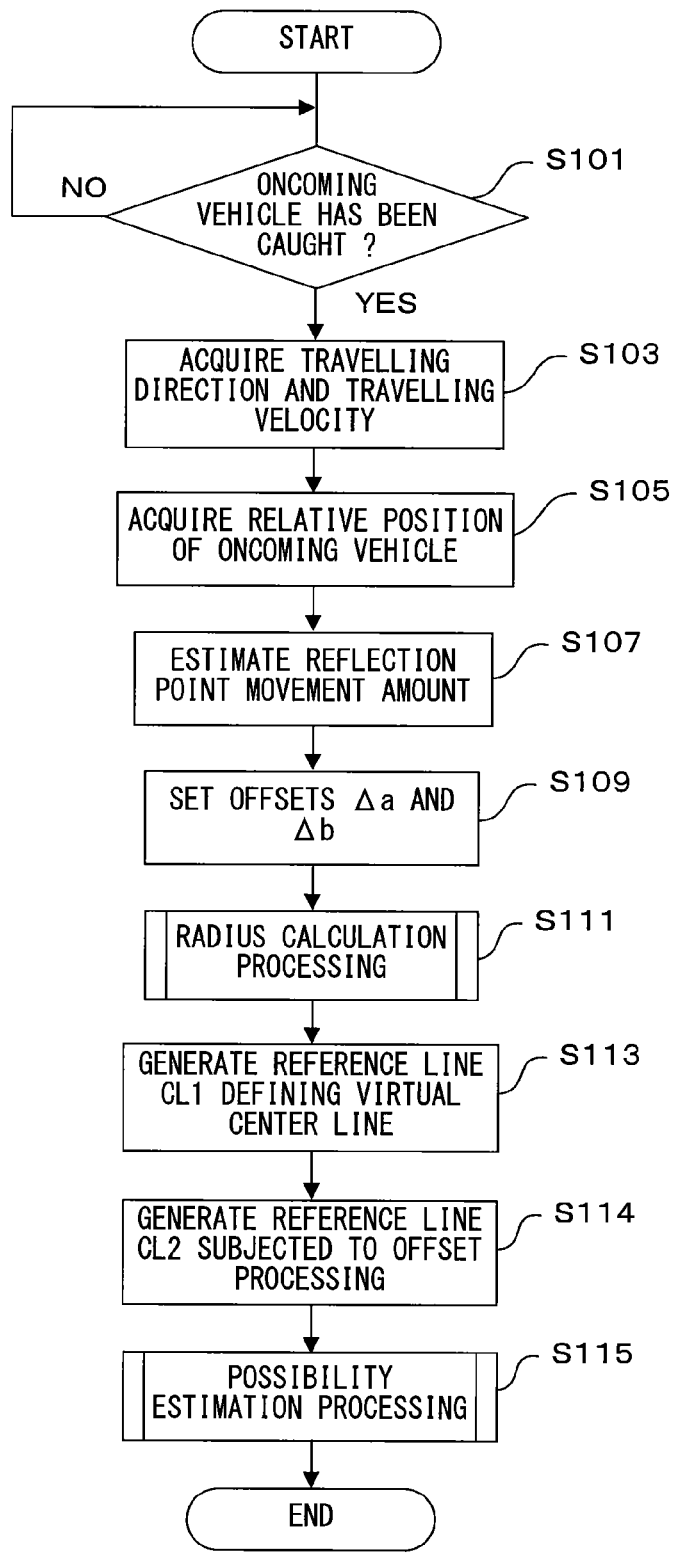
FIG. 11 is a flowchart showing an example of the operation of an object detection ECU1 shown in FIG. 1.

FIG. 11 is a flowchart showing an example of the operation of the object detection ECU1 shown in FIG. 1. First, the center line generation part 106 determines whether or not the oncoming vehicle VC2 has been caught by the radar sensor 24 (S101). If it has been determined that the oncoming vehicle VC2 has not been caught (NO in S101), the process stands by. If it has been determined that the oncoming vehicle VC2 has been caught (YES in S101), the movement amount detection part 101 acquires the velocity and the travelling direction of the vehicle VC1 (S103). Then, the relative position detection part 102 acquires the relative position of the electromagnetic wave reflection point on the oncoming vehicle VC2 with respect to the vehicle VC1 (S105). Next, the movement amount estimation part 113 estimates the movement amount of the reflection point on the oncoming vehicle VC2 (within the oncoming vehicle VC2) (S107). Next, the distance setting part 104 sets the offsets Δa and Δb (S109). Then, the radius calculation part 105 executes radius calculation processing for obtaining the radius R1 of the arc CL1 defining the virtual center line (S111). Next, the center line generation part 106 generates the reference line CL1 defining the virtual center line in the ground fixed coordinate system (S113). Next, the center line correction part 112 performs offset processing for the virtual center line generated by the center line generation part 106, to move the virtual center line toward the travelling lane of the vehicle VC1 by the estimated movement amount of the reflection point, thereby generating the reference line CL2 defining the virtual center line (S114). Next, the possibility estimation part 111 and the like execute possibility estimation processing for determining whether or not there is a possibility of collision with the oncoming vehicle VC2 (S115), and the processing ends here.

Figure 12:
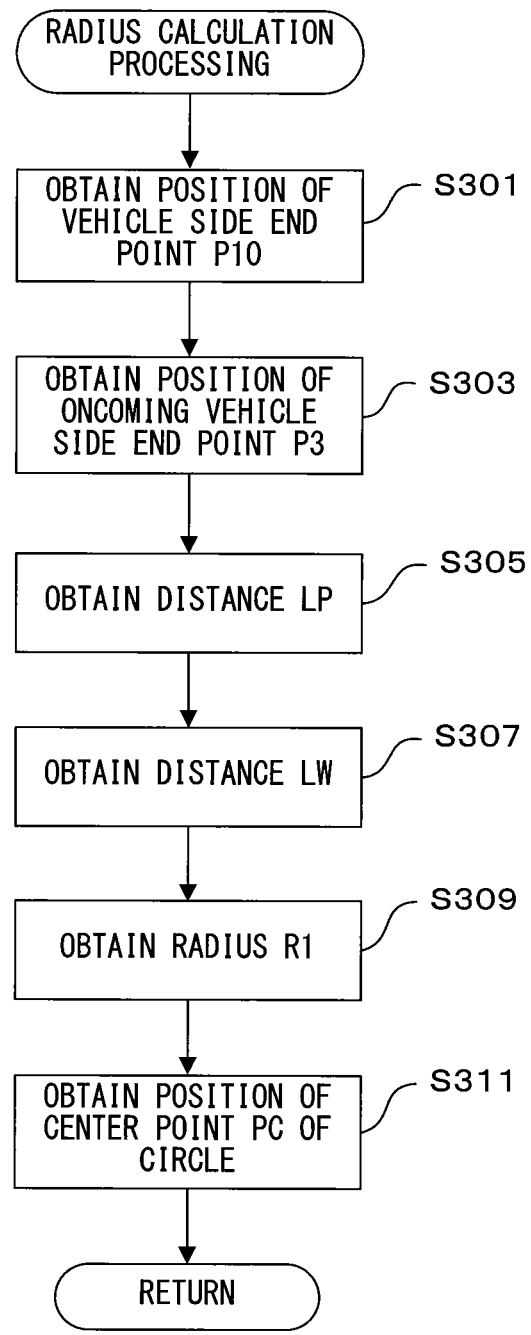
FIG. 12 is a detailed flowchart showing an example of a radius calculation processing executed in step S111 of the flowchart shown in FIG. 11.

FIG. 12 is a detailed flowchart showing an example of the radius calculation processing executed in step S111 of the flowchart shown in FIG. 11. It is noted that the following steps are all executed by the radius calculation part 105. First, the position of the vehicle side end point P10 is obtained based on the offset Δb set in step S109 of the flowchart shown in FIG. 11 (S301). Then, the position of the oncoming vehicle side end point P3 is obtained based on the offset Δa set in step S109 of the flowchart shown in FIG. 11 (S303). Next, the distance LP between the vehicle side end point P10 obtained in step S301 and the oncoming vehicle side end point P3 obtained in step S303 is obtained (S305). Next, the distance LW between the vehicle side end point P10 obtained in step S301 and the foot of a perpendicular from the oncoming vehicle side end point P3 obtained in step S303 to the width direction coordinate axis (here, X-axis) of the coordinate system, is obtained (S307). Then, the radius R1 of the arc CL1 is obtained, using the above expression (2), from the distance LP obtained in step S305 and the distance LW obtained in step S307 (S309). Next, the position of the center point PC of the circle is obtained (S311), and the process returns to step S113 of the flowchart shown in FIG. 11.

Figure 13:
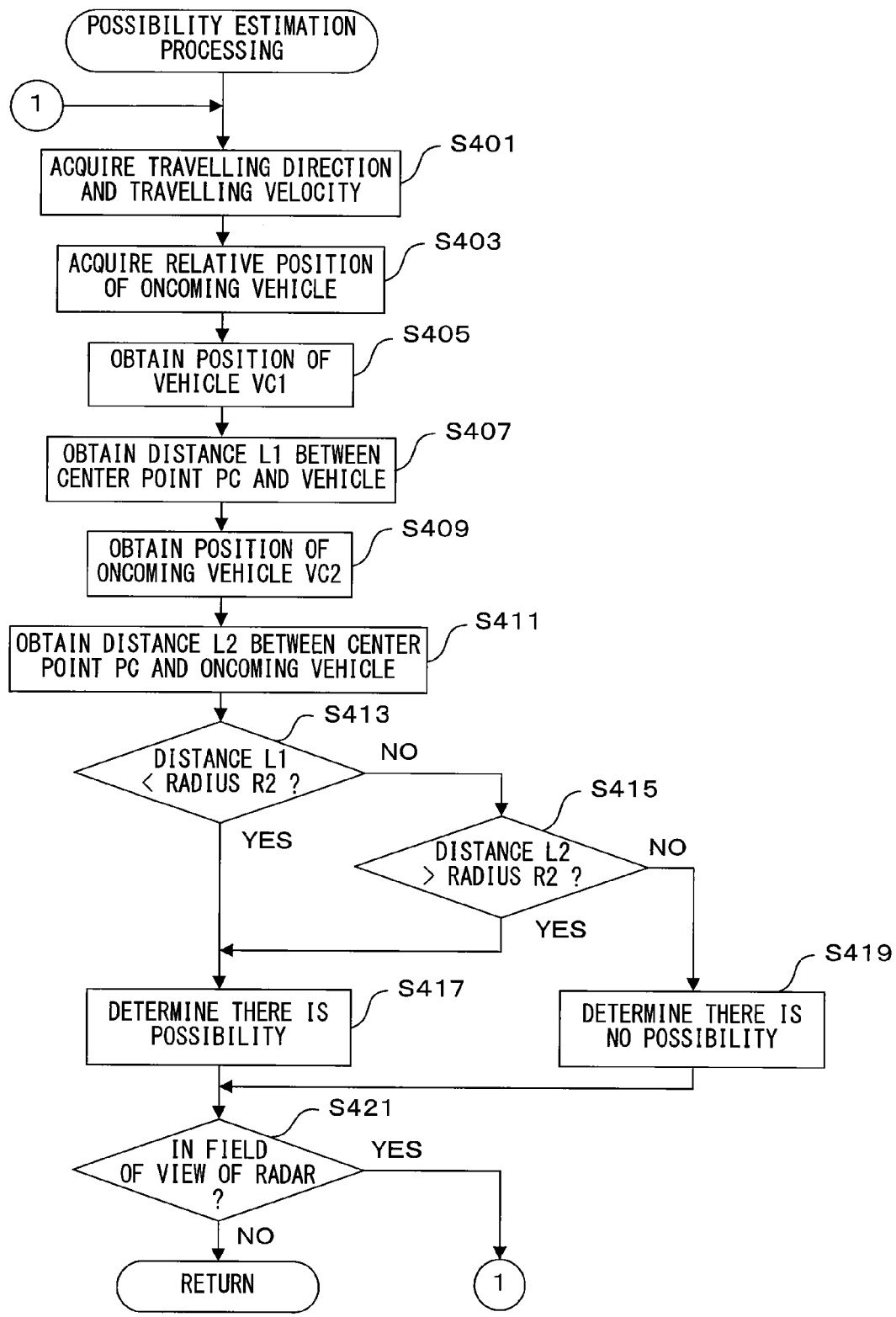
FIG. 13 is a detailed flowchart showing an example of a possibility estimation processing executed in step S115 of the flowchart shown in FIG. 11.

FIG. 13 is a detailed flowchart showing an example of the possibility estimation processing executed in step S115 of the flowchart shown in FIG. 11. First, the movement amount detection part 101 obtains the velocity and the travelling direction of the vehicle VC1 (S401). Then, the relative position detection part 102 obtains the relative position of the electromagnetic wave reflection point on the oncoming vehicle VC2 with respect to the vehicle VC1 (S403). Next, the second position calculation part 108 obtains the position of the vehicle VC1 in the ground fixed coordinate system (S405). Next, the second entry determination part 110 obtains the distance L1 between the position of the vehicle VC1 and the center position PC of the arc CL2 (S407). Then, the first position calculation part 107 obtains the position of the electromagnetic wave reflection point on the oncoming vehicle VC2 in the ground fixed coordinate system (S409). Next, the first entry determination part 109 obtains the distance L2 between the position of the electromagnetic wave reflection point on the oncoming vehicle VC2 and the center position PC of the arc CL2 (S411).

Then, the second entry determination part 110 determines whether or not the distance L1 obtained in step S407 is smaller than the radius R2 which has been subjected to the offset processing (S413). If it has been determined that the distance L1 is equal to or larger than the radius R2 which has been subjected to the offset processing (NO in S413), the first entry determination part 109 determines whether or not the distance L2 obtained in step S411 is larger than the radius R2 (S415). If it has been determined that the distance L1 is smaller than the radius R2 which has been subjected to the offset processing (YES in S413) or if the distance L2 is larger than the radius R2 which has been subjected to the offset processing (YES in S415), the possibility estimation part 111 determines that there is a possibility of collision with the oncoming vehicle VC2 (S417). If it has been determined that the distance L2 is equal to or smaller than the radius R2 which has been subjected to the offset processing (NO in S415), the possibility estimation part 111 determines that there is no possibility of collision with the oncoming vehicle VC2 (S419). After the processing of step S417 or step S419, the relative position detection part 102 determines whether or not the oncoming vehicle VC2 is still being caught by the radar sensor 24 (the oncoming vehicle VC2 is in the field of view) (S421). If it has been determined that the oncoming vehicle VC2 is in the field of view (YES in S421), the process returns to step S401, and then processing of step S401 and subsequent steps is repeatedly executed. If it has been determined that the oncoming vehicle VC2 is not in the field of view (NO in S421), the process ends here.

Thus, the travelling direction and the travelling velocity of the vehicle VC1 are detected, and the relative position of the oncoming vehicle VC2 with respect to the vehicle VC1 is detected. Then, at the predetermined timing, the reference line CL1 defining a virtual center line virtually set as a determination reference for the possibility of collision is generated between the vehicle VC1 and the oncoming vehicle VC2 in a ground fixed coordinate system, based on the detected travelling direction, and the detected relative position of the oncoming vehicle. The generated virtual center line is subjected to offset processing to move toward the travelling lane of the vehicle VC1 by the movement amount of the reflection point on the oncoming vehicle VC2. In addition, the position of the oncoming vehicle VC2 in the ground fixed coordinate system is obtained based on the detected travelling direction and travelling velocity, and the detected relative position, every predetermined time (here, every 100 msec). Then, whether or not the oncoming vehicle VC2 has crossed the virtual center line that has been subjected to the offset processing to enter the travelling lane is determined based on the obtained position of the oncoming vehicle VC2. If it has been determined that the oncoming vehicle VC2 has entered the travelling lane, it is determined that there is a possibility of collision with the oncoming vehicle VC2. Therefore, it is possible to appropriately estimate whether or not there is a possibility of collision with the oncoming vehicle VC2, on a curved road or the like.

That is, at the predetermined timing, the reference line CL1 defining a virtual center line virtually set as a determination reference for the possibility of collision is generated between the vehicle VC1 and the oncoming vehicle VC2 in the ground fixed coordinate system, based on the detected travelling direction, and the detected relative position of the oncoming vehicle VC2, and the reference line CL1 is subjected to offset processing to move toward the travelling lane of the vehicle VC1 by the reflection point movement amount S, thereby generating the reference line CL2. Therefore, even if the reflection point of a radar wave moves on the oncoming vehicle VC2, it is possible to appropriately estimate whether or not there is a possibility of collision of the vehicle VC1 with the oncoming vehicle VC2.

In addition, the position of the vehicle VC1 in the ground fixed coordinate system is obtained based on the detected travelling direction and travelling velocity, every predetermined time (here, every 100 msec). Then, whether or not the vehicle VC1 has crossed the virtual center line that has been subjected to the offset processing to enter the oncoming lane is determined based on the obtained position of the oncoming vehicle VC1. If it has been determined that the vehicle VC1 has entered the oncoming lane, it is determined that there is a possibility of collision with the oncoming vehicle VC2. Therefore, it is possible to appropriately estimate whether or not there is a possibility of collision with the oncoming vehicle VC2, on a curved road or the like.

That is, if, based on the position of the oncoming vehicle VC1 in the ground fixed coordinate system, it has been determined that the vehicle VC1 has crossed the virtual center line that has been subjected to the offset processing to enter the oncoming lane, it is determined that there is a possibility of collision with the oncoming vehicle VC2. Therefore, by correcting the position of the virtual center line to an appropriate position, it is possible to appropriately estimate whether or not there is a possibility of collision with the oncoming vehicle VC2 caused by the vehicle VC1 veering off into the oncoming lane on a curved road or the like.

It is noted that the collision estimation apparatus according to the present invention is not limited to the object detection ECU1 according to the above embodiment, but may be configured as follows.

(A) In the present embodiment, the case where the center line generation part 106 generates the arc CL1 having the predetermined radius R1, as the reference line CL1, has been described. However, the center line generation part 106 may generate a curved line with another shape, or a straight line, as the reference line CL1. For example, the center line generation part 106 may generate a curved line with a shape of quadratic curve or cubic curve, as the reference line CL1. In addition, for example, the center line generation part 106 may generate a straight line (or a polygonal line) as the reference line CL1.

(B) In the present embodiment, the case where the curved road is a right-hand curve has been described. However, the curved road may be a left-hand curve. In this case, if the distance L2 is smaller than the radius R2 of the arc CL2 which has been subjected to the offset processing, the first entry determination part 109 determines that the oncoming vehicle VC2 has crossed the virtual center line to enter the travelling lane. In addition, if the distance L1 is larger than the radius R2 of the arc CL2 which has been subjected to the offset processing, the second entry determination part 110 determines that the vehicle VC1 has crossed the virtual center line to enter the oncoming lane. In addition, although in the present embodiment, a curved road has been used as an example, the present embodiment is also applicable to a straight road.

(C) In the present embodiment, the case where the center line generation part 106 generates the reference line CL1 at a timing when the radar sensor 24R has caught the oncoming vehicle VC2 has been described. However, the center line generation part 106 may generate the reference line CL1 at another timing, instead of (or in addition to) the timing when the radar sensor 24R has caught the oncoming vehicle VC2. For example, the center line generation part 106 may generate the reference line CL1 at the timing when the radar sensor 24R has caught the oncoming vehicle VC2, and thereafter, may rectify (correct) the reference line CL1 every predetermined period (for example, 500 msec). In this case, it becomes possible to more appropriately generate the reference line CL1.

INDUSTRIAL APPLICABILITY

The present invention is applicable to, for example, an object detection apparatus provided in a vehicle, that estimates whether or not there is a possibility of collision with an oncoming vehicle travelling on an oncoming lane with respect to a travelling lane of the vehicle. In addition, the present invention is applicable to, for example, an object detection program that causes a computer provided in a vehicle to estimate whether or not there is a possibility of collision with an oncoming vehicle travelling on an oncoming lane with respect to a travelling lane of the vehicle.

DESCRIPTION OF THE REFERENCE CHARACTERS

1 object detection ECU (object detection apparatus)
101 movement amount detection part
102 relative position detection part (relative position detection section)
103 travelling direction calculation part
104 distance setting part
105 radius calculation part
106 center line generation part (center line generation section)
107 first position calculation part
108 second position calculation part
109 first entry determination part
110 second entry determination part
111 possibility estimation part
112 center line correction part (center line correction section)
113 movement amount estimation part (movement amount estimation section)
2 input device
21 vehicle velocity sensor
22 yaw rate sensor
23 steering sensor
24 (24R, 24L) radar sensor

The invention claimed is:

1. An object detection apparatus provided in a vehicle, the object detection apparatus comprising:
   a relative position detection section configured to radiate an electromagnetic wave to another vehicle present in front of the vehicle, and receive a reflection wave reflected from the other vehicle, thereby detecting the relative position of an electromagnetic wave reflection point on the other vehicle reflecting the electromagnetic wave, with respect to the vehicle;
   a movement amount estimation section configured to, based on the relative position of the electromagnetic wave reflection point with respect to the vehicle, estimate, as continuous values, a movement amount by which the electromagnetic wave reflection point will move on the other vehicle from a predetermined timing until the other vehicle approaches a vicinity of the vehicle; and
   a collision determination section configured to determine whether or not there is a possibility that the vehicle will collide with the other vehicle, based on the position of the electromagnetic wave reflection point and a collision determination reference that is set in advance, wherein
   the movement amount is calculated as a product of a width of the other vehicle, which is set in advance, and a reflection point movement rate, which is obtained in advance in accordance with the relative position, in a vehicle width direction of the vehicle, of the other vehicle with respect to the vehicle.

2. The object detection apparatus according to claim 1, wherein
   the position of the electromagnetic wave reflection point on the other vehicle continuously varies in accordance with movement of the other vehicle in a vehicle width direction of the vehicle.

3. The object detection apparatus according to claim 1, wherein the reflection point movement rate increases continuously or in a step-by-step manner as a distance between the electromagnetic wave reflection point and the vehicle increases.

4. The object detection apparatus according to claim 3, wherein
the distance is a distance in the vehicle width direction of the vehicle.

5. The object detection apparatus according to claim 3, wherein
the distance is a distance in the vehicle length direction of the vehicle.

6. The object detection apparatus according to claim 1, wherein
the other vehicle is an oncoming vehicle travelling on an oncoming lane with respect to a travelling lane on which the vehicle travels.

7. The object detection apparatus according to claim 1, further comprising:
a center line generation section configured to generate a virtual center line, based on the position of the vehicle and the position of the reflection point;
a center line correction section configured to perform correction processing for moving the virtual center line toward the vehicle by the movement amount; and
an entry determination section configured to determine whether or not the other vehicle has crossed the virtual center line that has been corrected, and has entered the travelling lane on which the vehicle travels, wherein
if the entry determination section has determined that the other vehicle has entered the travelling lane on which the vehicle travels, the collision determination section determines that there is a possibility that the vehicle will collide with the other vehicle.

8. A non-transitory computer readable medium having a program for detecting an object approaching a vehicle stored thereon, the program causing a computer provided in the vehicle to function as:
a relative position detection section configured to detect the relative position, with respect to the vehicle, of an electromagnetic wave reflection point on another vehicle reflecting an electromagnetic wave radiated forward from a radar apparatus provided in the vehicle;
a movement amount estimation section configured to, based on the relative position of the electromagnetic wave reflection point with respect to the vehicle, estimate, as continuous values, a movement amount by which the electromagnetic wave reflection point will move on the other vehicle from a predetermined timing until the other vehicle approaches a vicinity of the vehicle; and
a collision determination section configured to determine whether or not there is a possibility that the vehicle will collide with the other vehicle, based on the position of the electromagnetic wave reflection point and a collision determination reference that is set in advance, wherein
the movement amount is calculated as a product of a width of the other vehicle, which is set in advance, and a reflection point movement rate, which is obtained in advance in accordance with the relative position, in a vehicle width direction of the vehicle, of the other vehicle with respect to the vehicle.

* * * * *